United States Patent Office 2,898,374
Patented Aug. 4, 1959

2,898,374

NUCLEUS ALKYLATED PHLORACYLOPHENONES AND PROCEDURE FOR THE PRODUCTION OF SUCH COMPOUNDS

Wolfgang Riedl, Munich, Germany, assignor to Schwarz Laboratories, Inc., a corporation of New York No Drawing. Application January 27, 1955
Serial No. 484,585

Claims priority, application Germany March 1, 1954

11 Claims. (Cl. 260—586)

My German Patent No. 899,198 teaches that in 2,4,6-trihydroxyacylophenones (designated below as type A), alkyl residues can be introduced to form nucleus-alkylated derivatives thereof, by exchanging the monovalent poly-substituted metal compounds of 2,4,6-trihydroxy-acylophenones with alkyl, alkenyl or aralkyl halides whose halogen is particularly reactive (for example, dimethyl-allylbromide). In this procedure one operates in a solvent (benzol, ether or ether plus some methanol) that has but slight activating effect upon the reactants, thus to obtain compounds designated below as B, C and D.

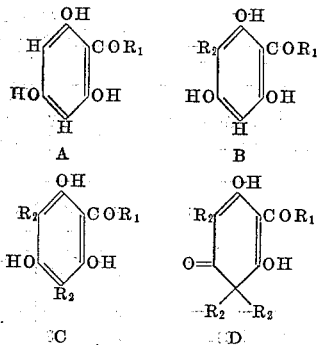

It has been found, surprisingly, that these nuclear-substitution reactants are greatly facilitated by the selection of a particular class of solvents, more especially solvents which have a considerable activating effect upon the reactants and are characterized by a high dielectric constant of the order of 10 or more and preferably more than 20.

The improvement obtained thereby is a multiple one:

(1) According to the invention, good yields of the desired products are obtained, even with lesser reactive alkyl-halides (such as methyliodide, isoamyliodide), which react to much lesser degree than those used according to the procedure disclosed in the earlier patent.

(2) Of the products resulting from the process, not only the mono- (type B), di- (type C) and tri-nucleus-alkylated (type D) phloracylophenones can be isolated, but also the tetra-alkylated products (type E), as well as the geminal-di-substituted ones of type F (identified below), (the synthesis of each of which is now possible for the first time), can be obtained, thus completing the series of nucleus-substituted products of the type noted of phloracylophenones:

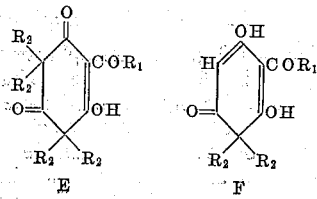

(3) The yields of pure nucleus-substituted phloracylo-phenones of types B to F are about 70 percent of theory. Also with the tri-γ,γ-dimethyl-allyl-alkaylation described in the earlier patent, the compounds of type D can be obtained according to the present invention with substantially higher yields.

(4) According to the present invention, solvents with considerable activating effect upon the reactants, and of high dielectric constant are used to advantage, more particularly the lower alkanols, the lower ketones, distilled water and mixtures of these, and they promote the krypto-ionic course of reaction between alkyl halides and phloracylophenone-metal compound.

As noted, it is not necessary, according to the present invention, that the halogen be particularly reactive, in the saturated or unsaturated and eventually substituted alkyl, alkenyl or aralkyl primary or secondary halides may be used, thus permitting a much wider range of end products. Preferably the alkyl halides are saturated and have less than 20 carbon atoms in the chain. This new feature is especially valuable as it permits the direct preparation of nucleus substituted phloracylophenones which are fully saturated in all substituents and therefore much more stable than those products which can be formed by my previously disclosed procedure. In the phloracylo-phenones used (type A) or in their already partially nucleus-substituted derivatives (of types B, C, D and F) which admit of further nuclear substitution, the further residue or residues can be selected as desired.

This new method of synthesis makes possible, for the first time, preparation of a whole new series of compounds having antibiotic properties similar to those reported for the naturally occurring hop resin, lupulon, but with the important practical advantage that synthetic compounds can be made which are both more stable and more potent against specific groups of organisms by appropriate selection of the acyl group, and the alkyl, alkenyl or aralkyl substituents attached to the nucleus at the 3 and/or 5 carbon position.

The further conditions of the reaction such as concentration of the reactants, the type of metal compound and the temperature of the reaction are so chosen that swift exchange occurs while substantially avoiding hydrolysis of the starting materials, splitting of the acyl-residues or decomposition of the products of the process.

The products of the process are worked up by usual procdure, such as extraction with alkalis, sublimation, chromatography or utilization of specific solubility, etc.

Products of the process possess bacteriostatic activity which inhibits growth of a number of organisms known to produce disease or food spoilage, and may also be used for the production of physiologically active material.

The general method is carried out in the following manner. Any suitable phloracylophenone or partially nuclearly-substituted phloracylophenone is reacted in a liquid that has considerable activating effect upon the reactants and has a high dielectric constant, and comprises a solution of methanol and alkali metal (or alkali metal methylate such as sodium methylate) to which is added the halide of an alkyl, alkenyl or aralkyl compound. After the reaction is complete, the excess methanol and halide compound may be distilled off in vacuo, and the residue partitioned between suitable dilute aqueous alkaline solutions and an appropriate solvent such as ether or petroleum ether. The aqueous fractions are acidified to precipitate crude products, which are further fractionated according to solubility and crystallized finally from aqueous methanol or other suitable solvents. The less-water-soluble substitution products can be recovered from the non-aqueous layer in the partitioning process. By varying the ratio of the three components: phloracylophenone, alkali metal methylate, and halide compound, the production of either mono, di, di-geminal, tri, or tetra substituted nuclei can be favored. The method also permits preparation of substituted phloracylophenones with more than one kind of substituent, and it is possible to form a mono- di, or tri substituted compound of one substituent and subsequently treat successively with one or more different halide compounds, thus adding a second, third or fourth type of alkyl, aralkyl, or aryl substituent to the nucleus, depending on the number of positions that are free.

EXAMPLE 1

Methyl substituted phlor-acetophenones (a) For monomethylation 4.0 g. of anhydrous phloracetophenone may be dissolved in 30 ml. of absolute methanol, added to a freshly prepared ice-cold solution of 0.547 g. sodium (1 equivalent) in 10 ml. of methanol, and then 20 g. of methyliodide (6 equivalents) are added. This is left standing for several hours in the refrigerator, then for 5 days at room temperature and worked up in the following manner.

The practically neutral reaction mixture is slightly acidified and the excess methanol and methyliodide distilled off in vacuo. The residue is taken up in ether, and the ether solution is then extracted successively with aqueous saturated sodium bicarbonate, 10 percent aqueous sodium carbonate, and, finally, with 2 N sodium hydroxide.

The sodium carbonate extract is washed with ether and then acidified, whereupon crude 3-methyl phloracetophenone precipitates as yellowish needles (2.77 grams equal to 64 percent of theory, M.P. 160–180° C.). After two recrysallizations from about 50 ml. of water, one obtains almost colorless clusters of needles M.P. 207° C. of the product identified in the title of Example 1. If the molar relationship of phloracetophenone:sodium methylate:methyliodide is altered to 1:2:1 or 1:3:1 corresponding yields result of 3-methylphloracetophenone of 42 percent and 44 percent of theory, respectively. The essential point of control is that no more than one equivalent of alkali metal or of halide should be present if mono-substitution of the nucleus is to be favored. In view of the lower yield of the desired product here obtained, it follows that in general it is preferable to control mono-substitution by limiting the amount of alkali metal methylate to the equivalent number of nucleus substitutes required and providing some excess of halogen compound.

(b) For dimethylation, trimethylation, and tetra-methylation, the ratio of these reactants are respectively in the order of 1:2:6, 1:3:6, and 1:4:8. Here again the amount of excess halide used is somewhat less critical than the molar ratio of phloracylophenone to alkali metal methylate. In polymethylations, lesser proportions of lower homologues are generally formed which can be recovered from the reaction products as by-products, or recycled in the process.

(c) As an example of polymethylation, 20 g. phloracetophenone is dissolved in 150 ml. of methanol, to which is added, while cooling, a solution of 8.21 g. (3 equiv.) sodium in 50 ml. methanol. Under further cooling 101.5 g. methyliodide (6 equiv.) is added and the red-brown solution is left standing for 5 days at room temperature under exclusion of humidity and air. Then excess methyliodide and methanol are distilled off in vacuo and the residue is mixed with 250 ml. each of water and ether. After acidifying with dilute sulfuric acid to the pH of Congo red, the aqueous solution is shaken twice with 50 cc. ether, and the combined red colored ether extracts extracted 8 times with 30 cc. saturated aqueous potassium bicarbonate solution (followed with 10 percent soda solution and caustic as in Example 1a).

Upon acidifying the bicarbonate solution, previously washed once with ether, a red-brown precipitate is formed of 14.08 g. (55.2 percent of theory), long spears and prisms with M.P. 140–150° C. This amount is digested in the cold with 4 washings each of 50 cc. benzol. The residue not dissolved with cold benzol is recrystallized from 110 cc., 30 percent methanol and yields 10.20 g. (=40.8 percent of theory) 1-acetyl-3,3,5-trimethylcyclohexa-1,5-diene-2,6-diol-4-one with M.P. 160°. Upon dilution of the mother liquor of the latter compound with about 100 cc. of water 1-acetyl-3,3-di-methyl-cyclohexa-1,5-diene-2,6-diol-4-one crystallizes out 1.0 g. (=4.3 percent of theory) M.P. 169° C. The combined filtered cold benzol extracts are concentrated, and the residue recrystallized from 30 percent methanol: 0.28 g. (=1.1 percent of theory) 1-acetyl-3,3,5,5-tetra-methyl-cyclohexa-1-ene-2-ol-4,6 dione with M.P. 54°. The 3,3- and the 3,5-dimethyl compounds can be isolated from the soda extract by acidification and recrystallization from 30 percent methanol, yielding conjointly about 3 percent to 5 percent of needles with M.P. 174 to 176 and M.P. 220° C. respectively. The mixture of the 3,3 and 3,5 dimethyl compound may be separated, if desired, by fractionation according to solubility and crystallization If one works in concentrated or less concentrated methanolic solution with such trimethylation formulations and uses instead of sodium methylate, potassium methylate practically the same yields are obtained ranging in about the following limits:

| Phloracetophenone | Yield (percent of theory) | M.P., ° C. |
| --- | --- | --- |
| 3,3-dimethyl | }2.5–6.0 | { 174–176 |
| 3,5-dimethyl |  | 220 |
| 3,3,5-trimethyl | 40.0–60.0 | 160 |
| 3,3,5,5-tetramethyl | 1.0–10.0 | 54 |

If various reaction media are used for such trimethylation formulations about the following yields are obtained:

| Solvent | Yield (percent of theory) for— | | | |
| --- | --- | --- | --- | --- |
|  | E[1] | 3,3-dimethyl | 3,3,5-trimethyl | 3,3,5,5-tetramethyl |
| Methanol (From Example 1) | 33.7 | 4.3 | 40.8 | 1.1 |
| Ethanol | 25.7 | Trace | 41.2 | 3.0 |
| Tert.-Butanol | 11.4 | Trace | 20.0 | 23.5 |
| Acetone | 21.3 | Trace | 15.0 | 17.8 |
| Benzol | 2.283 |  | Trace | Trace |
| Ether | 4.335 |  | Trace | Trace |

[1] E is dielectric constant.

As an example of how the products vary with change in the ratio of reactants, a few typical results are given under conditions of methylation similar to the above example where methanol is illustratively used as the solvent.

| Molar Relationship | Yields (percent of theory) for— | | |
| --- | --- | --- | --- |
|  | 3,5-dimethyl, 3,3.-dimethyl | 3,3,5-trimethyl | 3,3,5,5-tetramethyl |
| 1:1:2 |  | 4.0 |  |
| 1:2:4 | 5.3 | 25.2 | 5.4 |
| 1:3:6 | 2.5 to 6.0 | 40 to 60 | 1.0 to 10.0 |
| 1:4:8 | Trace | 30.8 | 35.8 |

EXAMPLE 2

Isoamyl substituted phloracetophenones

To a solution of 4.0 g. phloracetophenone and 1.64 g. sodium (3 equiv.) in 20 cc. absolute methanol is added under cooling 23 g. isoamyliodide (6 moles). After 5 days standing at room temperature, the clear red solution shows a pH of about 9. This is acidified with 6 cc. 2 N-hydrochloric acid and methanol and the excess isoamyliodide is evaporated (finally in vacuo). The remaining oil is dissolved in 50 cc. methanol to which is added 100 cc. petroleum ether warm (B.P. 40–60°) and this is diluted with 50 cc. 2% sulfuric acid. Rapid extraction is performed and the petroleum ether layer separates whereby the above compound crystallizes out already to a great extent. The aqueous methanolic layer is extracted twice with each 100 cc. of warm petroleum ether. The combined petroleum ether extracts isolate upon standing 2.96 g. 1 acetyl-3,3,5-tri-isoamylcyclohexa-1-5-diene-2,6-diol-4-one (33 percent of theory) as colorless fine prisms with M.P. 154–157°; after recrystallization from 80 percent methanol, M.P. 161–162°.

The aqueous methanolic layer is diluted with water and chilled, whereupon after several hours crude 3-isoamyl phloracetophenone crystallizes (0.32 g., 5.7 percent of theory). After recrystallization from methanol or benzol, slightly yellow prisms M.P. 188° C. are obtained.

EXAMPLE 3

γ,γ-dimethyl allyl substituted phloracetophenones

To the suspension of 7.0 g. phloracetophenone and 2.87 g. of sodium (3 equiv.), dissolved in 40 cc. methanol, 18.6 g. γ,γ-dimethylallylbromide (3 equiv.) are added during 30 min. under shaking and cooling in brine. After 12 hours standing in the refrigerator and for the same time at room temperature, without filtering from the separated sodium bromide, it is extracted directly with petroleum ether. The main portion of 3,3,5,γ,γ-dimethylallyl phloracetophenone precipates on chilling the petroleum ether extract. Additional yield is obtained by concentrating the mother liquor. The combined crudes are recrystallized from dilute methanol yielding 5.58 g. (40.5 percent of theory) with a M.P. of 121° C. From the aqueous methanolic layer, after diluting with water crude-3-(γ,γ-di-methylallylphloracetophenone) is obtained 0.46 g. (4.7 percent of theory) M.P. 170–171°. Recrystallization from dilute methanol results in clusters of prisms with M.P. 172° C.

EXAMPLE 4

γ,γ-Dimethyl allyl substituted phlorpropiophenone 4.0 g. phlor-propiophenone, 1.52 g. sodium (3 equiv.) in 20 cc. of methanol and 9.82 g. γ,γ-di-methylallybromide (3 mole) were exchanged with one another as in Example 3 and worked up. After boiling down the petroleum ether extracts (160 ml.) 7.66 g. of resin remain, which produces, after recrystallization from 50 ml. hexane (B.P. 60–69° C.) 3.06 g. colorless prisms (36.2 percent of theory) of 1-propionyl 3,3,5-tri-γ,γ-dimethylallyl-cyclohexa-1,5-diene-2,6-diol-4-one with M.P. 99–101° C. From the aqueous methanolic layer is obtained 0.27 g. (4.9 percent of theory) 3-γ,γ-dimethyl allyl phlorpropiophenone as colorless prisms (recrystallized from dilute methanol) with M.P. 160–161°.

EXAMPLE 5

1-acetyl, 3,3,5, tribenzyl-cyclohexa-1,5-diene-2,6-diol-4-one 10.0 g. phloracetophenone, 4.10 g. sodium (3 equiv.) dissolved in 50 cc. methanol, are treated during half an hour under strong cooling and stirring with a mixture of 22.6 g. benzylchloride (3 moles) and 25 cc. methanol. After three days of standing in the refrigerator, the clear red solution standing above the sodium chloride precipitate shows a pH of about 8. Acidification is done with 100 cc. 2 percent sulfuric acid and several extractions are made with altogether 250 cc. benzol. Subsequently, the combined benzol extracts are filtered and extracted with 10 successive 30 cc. portions of 50 percent aqueous methanol which have been saturated with potassium bicarbonate. The combined aqueous methanolic potassium bicarbonate extracts are washed with 22 cc. of benzol and then acidified with hydrochloric acid. The oil separating hereby solidifies upon some standing in the refrigerator and is sucked off the next day, washed with water to substantial neutrality and dried: 17.0 g. (65 percent of theory) with M.P. 110–115°; after recrystallization from benzol petroleum ether fine needles combined into bundles with M.P. 118–119° are obtained.

EXAMPLE 6

1-acetyl-3-methyl-3,5-diethyl-cyclohexa-1,5-diene-2,6-diol-4-one

To a solution of 4.0 g. 3-methyl phloracetophenone and 2.37 g. sodium (2 equivalents) in 20 cc. of absolute methanol, is added, under cooling 13.7 g. ethyl iodide (4 equivalents). After five days standing at room temperature, the clear red solution is acidified with 2 N hydrochloric acid to pH of about 5.5–6.0, and the excess ethyl iodide is evaporated in vacuo. The remaining oil is dissolved in 50 cc. methanol to which is added 100 cc. warm petroleum ether (B.P. 40–60°) and this is diluted with 50 cc. 2 percent sulfuric acid. Rapid extraction is performed, using two additional 100 cc. portions of warm petroleum ether. 1 - acetyl - 3-methyl-3,5-diethyl-cyclohexa-1,5-diene-2,6-diol-4-one crystallizes out of the combined extracts on standing, and may be recrystallized from 80 percent methanol: yield 30 percent of theory.

By similar methods, compounds in the following table have been made, columns refer to the various substituents in the structural diagrams:

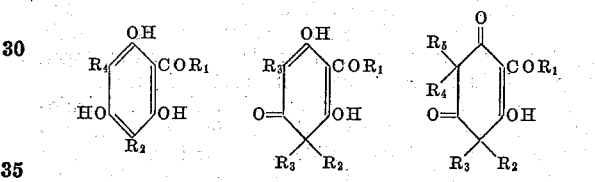

| $COR_1$ | Substituent | Locations | M.P., °C. | Approx. Yield, Percent |
|---|---|---|---|---|
| isovaleryl | dimethylallyl | $R_2$ | 138.5–140 | 9 |
| Do | do | $R_2, R_3, R_4$ | 93 | 33.0 |
| phenacetyl | do | $R_2$ | 163 | 3.5 |
| Do | do | $R_2, R_3, R_4$ | 109 | 44.1 |
| Do | methyl | $R_2, R_3, R_4$ | 143 | 42.5 |
| Do | ethyl | $R_2, R_3, R_4$ | 100 | 30.5 |
| Chlorphenacetyl | dimethylallyl | $R_2$ | 197 | 10.5 |
| Benzoyl | do | $R_2, R_3, R_4$ | 152 | 39 |
| Butyryl | do | $R_2, R_3, R_4$ | 106–107 | 31.2 |
| isobutyryl | do | $R_2, R_3, R_4$ | 91–92 | 27.3 |
| n-capryl | do | $R_2, R_3, R_4$ | 89–90 | 29.2 |
| isocapryl | do | $R_2, R_3, R_4$ | 89–91 | 28.0 |
| acetyl | methyl | $R_2, R_3, R_4, R_5$ | 54 | 35.8 |

As many changes could be made in the above process and product and different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. Process for the production of nucleus substituted phloracylophenones which comprises exchange of the alkali metal salts of phloracylophenones with a halide selected from the group consisting of primary and secondary alkyl, alkenyl and aralkyl halides having less than twenty carbon atoms in a liquid having a dielectric constant between 10 and 88, such liquid being selected from the group which consists of lower alkanols, lower ketones, water and mixtures thereof.

2. The process recited in claim 1 in which the halide compound is the iodide.

3. The process for the production of stable nucleus poly-substituted phloracylophenones, which comprises reacting phloracylophenones in the form of alkali metal salts with an alkyl halide having less than twenty carbon atoms, in a liquid having a dielectric constant between 10 and 88, said liquid being selected from the group consisting of lower alkanols, lower ketones, water and mixtures thereof.

4. Process for production of nucleus-substituted phloracylophenones which comprises dissolving a phloracylophenone in a lower alkanol having less than five carbon atoms, adding to the solution alkali metal and halide selected from the group consisting of primary and secondary alkyl, alkenyl and aralkyl halides having less than twenty carbon atoms, distilling off in vacuo the excess alkanol and halide, and thereupon subjecting the residue to fractional extraction and crystallization.

5. Process of producing nucleus-substituted phloracylophenones which comprises treating phloracylophenones in a liquid having a dielectric constant between 10 and 88, said liquid being selected from the group consisting of lower alkanols, lower ketones, water and mixtures thereof, in the presence of alkali metal alcoholate in proportions of alkali metal sufficient to form alkali metal salt equivalent to the number of moles (from 1 to 4) with which the nucleus is to be substituted, with a halide selected from the group consisting of primary and secondary alkyl, alkenyl and aralkyl halides, having less than twenty carbon atoms, the halide being present in at least stoichiometric proportions to the alkali metal alcoholate added.

6. The process recited in claim 5 as applied to the production of the phenone with a predominance of mono substitution product of the nucleus, by selecting the ratio of phloracylophenone to alkali metal alcoholate to halogen compounds in the range between 1:1:1 and 1:1:3.

7. The process recited in claim 5, in which the stoichiometric ratio of the alkali metal alcoholate to phloracylophenone is 4:1 and the halide compound is present in excess of 4 equivalents in relation to the phloracylophenone.

8. Process of producing nucleus-substituted phloracylophenones which comprises treating the phloracylophenone in a solvent having a dielectric constant between 10 and 88, said solvent being selected from the group consisting of lower alkanols, lower ketones, water and mixtures thereof, in the presence of alkali metal alcoholate in proportion of alkali metal sufficient to form alkali metal salts at all points in the nucleus where substitution is desired, with a halide selected from the group consisting of primary and secondary alkyl, alkenyl and aralkyl halides having less than twenty carbon atoms, and in which the proportion of the halide in respect to the alkali metal is in the ratio 2:1 to 4:1.

9. The process of producing relatively high yield of tri-nucleus-substituted phloracylophenone by treating the same in a liquid having a dielectric constant between 10 and 88, said liquid being selected from the group which consists of lower alkanols, lower ketones, water and mixtures thereof, in the presence of alkali metal alcoholate with $\gamma,\gamma$-dimethyl-allyl halide in which the proportions of the phloracylophenone to alkali metal to halide are between 1:2:4 and 1:4:8.

10. The process for the production of iso-amyl substituted phloracylophenone, which comprises dissolving phloracylophenone in a lower alcohol, and adding 3 molar equivalents of alkali metal alcoholate and three to six molar equivalents of iso-amyl halide, and recovering the reaction products therefrom by fractional extraction and crystallization.

11. 1-acetyl, 3,3,5,5-tetra alkyl, cyclohexa-1-ene-2-ol-4,6,dione in which the alkyl is a lower alkyl.

References Cited in the file of this patent

UNITED STATES PATENTS

| | | |
|---|---|---|
| 2,640,856 | Carson | June 2, 1953 |

FOREIGN PATENTS

| | | |
|---|---|---|
| 157,854 | Great Britain | 1922 |
| 407,666 | Germany | Dec. 19, 1924 |
| 684,124 | Great Britain | Dec. 10, 1952 |
| 899,198 | Germany | Dec. 10, 1953 |